(12) United States Patent
Shriki

(10) Patent No.: US 10,748,517 B2
(45) Date of Patent: Aug. 18, 2020

(54) TUNER

(71) Applicant: Itzhak Shriki, Herzlia (IL)

(72) Inventor: Itzhak Shriki, Herzlia (IL)

(73) Assignee: Itzhak Shriki, Herzlia (IL)

( * ) Notice: Subject to any disclaimer, the term of this patent is extended or adjusted under 35 U.S.C. 154(b) by 0 days.

(21) Appl. No.: 16/324,729

(22) PCT Filed: Aug. 9, 2017

(86) PCT No.: PCT/IL2017/050881
§ 371 (c)(1),
(2) Date: Feb. 11, 2019

(87) PCT Pub. No.: WO2018/029686
PCT Pub. Date: Feb. 15, 2018

(65) Prior Publication Data
US 2019/0180726 A1 Jun. 13, 2019

(30) Foreign Application Priority Data
Aug. 11, 2006 (IL) .......................................... 247228

(51) Int. Cl.
*G10H 1/44* (2006.01)
*G10G 7/02* (2006.01)
(Continued)

(52) U.S. Cl.
CPC ................ *G10H 1/44* (2013.01); *G01G 7/02* (2013.01); *G10D 1/08* (2013.01); *G10D 3/14* (2013.01); *G10G 7/02* (2013.01)

(58) Field of Classification Search
CPC ...................................................... G10H 1/44
See application file for complete search history.

(56) References Cited

U.S. PATENT DOCUMENTS

D290,371 S * 6/1987 Slayer ............................ 84/454
D487,905 S * 3/2004 Nelson .......................... D17/99
(Continued)

FOREIGN PATENT DOCUMENTS

| CN | 2582101 Y | 10/2003 |
| CN | 102035234 A | 4/2011 |
| CN | 203607091 U | 5/2014 |

OTHER PUBLICATIONS

International Search Report; PCT Application No. PCT/IL2017/050881; dated Nov. 20, 2017.
(Continued)

*Primary Examiner* — Robert W Horn
(74) *Attorney, Agent, or Firm* — Polsinelli PC

(57) ABSTRACT

A tuning device for a musical instrument includes a body and a neck extending out from the instrument's body. The neck has a free end including a headstock. The headstock includes an anterior instrument face, a posterior instrument face essentially opposite to the anterior instrument face, and at least one tuning key disposed on the posterior instrument face. The tuning device includes a tuning display and is engagable with one or more of the at least one tuning key, having a shape of a right-handed triangle fused to an oblong. The tuning display is disposed on the hypotenuse of the triangle. The display is positioned on the tuning device such as to essentially face the instrument's body when the tuning device is both engaged with the one or more tuning key, and entirely disposed above the posterior surface.

29 Claims, 10 Drawing Sheets

(51) Int. Cl.
  *G10D 3/14* (2020.01)
  *G01G 7/02* (2006.01)
  *G10D 1/08* (2006.01)

(56) References Cited

U.S. PATENT DOCUMENTS

| | | | | |
|---|---|---|---|---|
| 6,965,067 | B2 * | 11/2005 | Kondo | G10G 7/02 |
| | | | | 84/454 |
| 7,049,502 | B2 | 5/2006 | Taku et al. | |
| 7,265,282 | B2 * | 9/2007 | Membreno | G10G 7/02 |
| | | | | 84/453 |
| 7,390,951 | B2 * | 6/2008 | Dulaney | G10G 7/02 |
| | | | | 84/454 |
| 7,655,851 | B2 | 2/2010 | Nagakura | |
| D629,837 | S * | 12/2010 | Ishihara | D17/20 |
| D661,342 | S * | 6/2012 | Ridinger | D17/99 |
| D666,664 | S * | 9/2012 | Steinberger | D17/99 |
| D703,263 | S * | 4/2014 | D'Addario | D17/99 |
| 9,495,946 | B2 * | 11/2016 | D'Addario | G10D 3/14 |
| D775,271 | S * | 12/2016 | Ridinger | D14/188 |
| D779,586 | S * | 2/2017 | Araki | D17/20 |
| 9,728,170 | B2 * | 8/2017 | Slaton | G10G 7/02 |
| 2005/0087060 | A1 * | 4/2005 | Taku | G10G 7/02 |
| | | | | 84/455 |
| 2010/0043624 | A1 | 2/2010 | Nagakura | |
| 2013/0074677 | A1 | 3/2013 | D'Addario et al. | |
| 2019/0180726 | A1 * | 6/2019 | Shriki | G10D 1/08 |

OTHER PUBLICATIONS

Written Opinion of PCT Application No. PCT/IL2017/050881; dated Nov. 20, 2017.
English Language Abstract of CN203607091; Retreived From www.espacenet.com on Jan. 28, 2019.
English Language Abstract of CN2582101; Retreived From www.espacenet.com on Jan. 28, 2019.
English Language Abstract of CN102035234; Retreived From www.espacenet.com on Jan. 28, 2019.

* cited by examiner

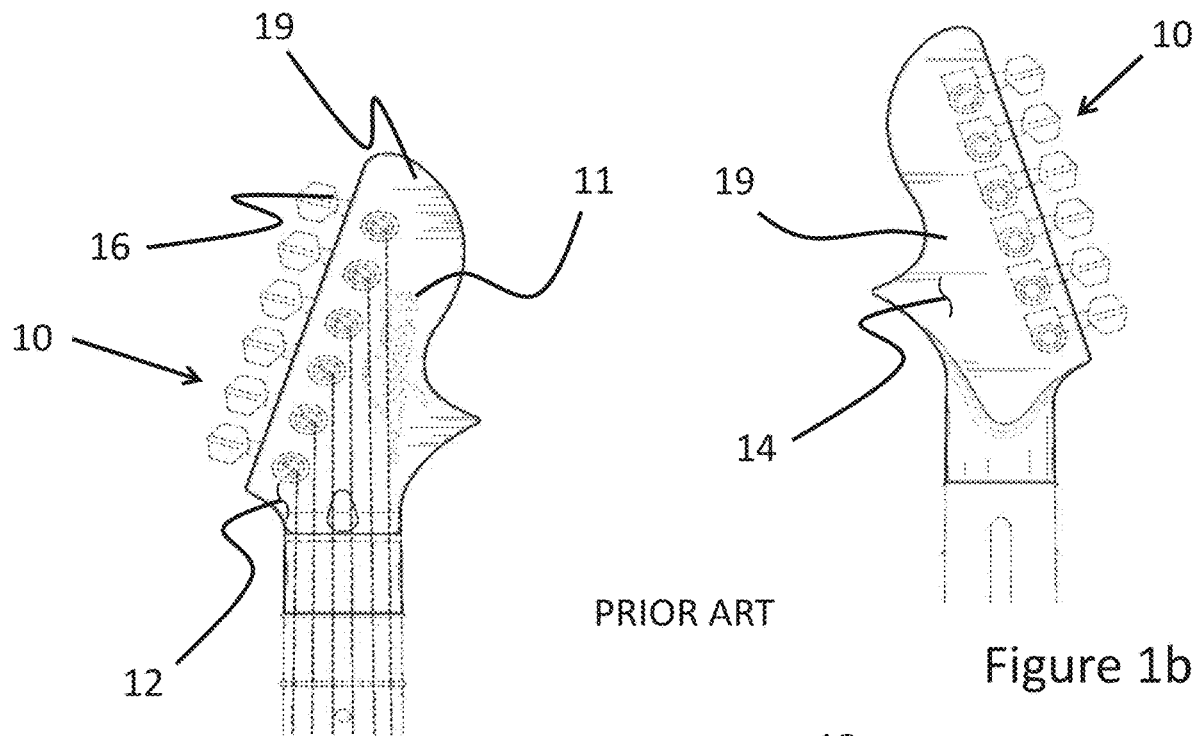
PRIOR ART
Figure 1a
Figure 1b
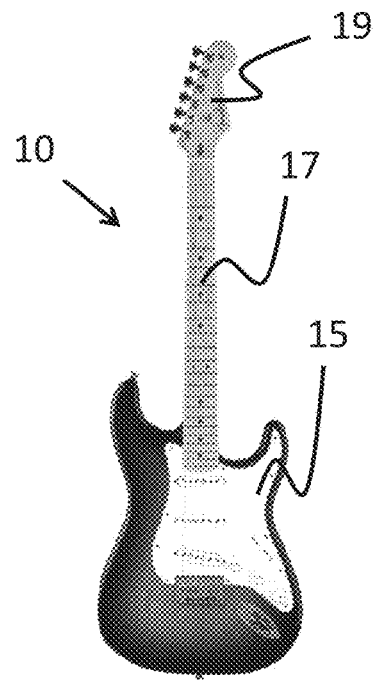
Figure 1c

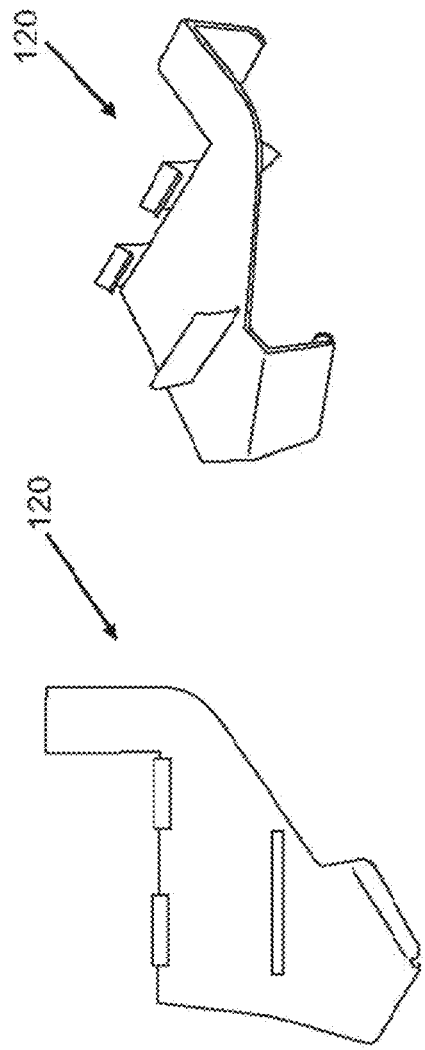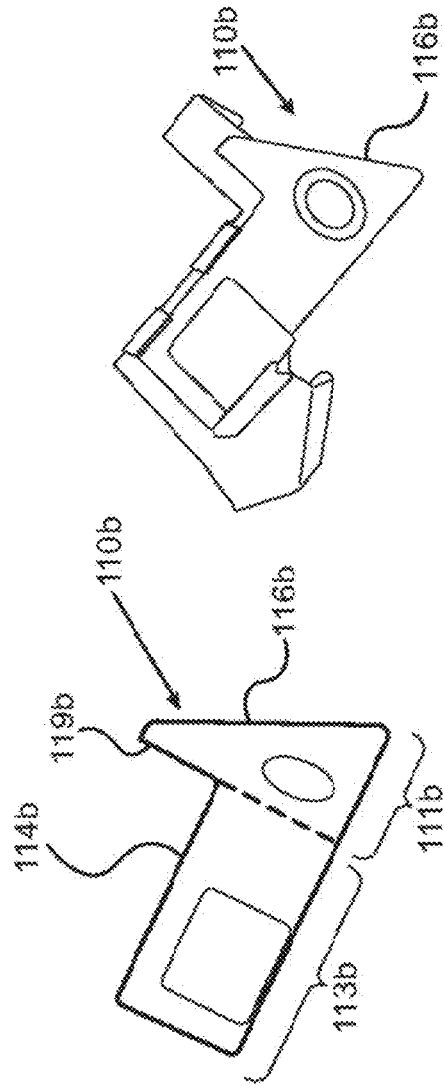
Figure 5a
Figure 5b
Figure 5c
Figure 5d

TUNER

CROSS-REFERENCE TO RELATED APPLICATIONS

This application is a national stage entry of PCT/IL2017/050881 filed Sep. 8, 2017, which claims priority from Israeli patent application 247228 filed on Aug. 11, 2016, the contents of each are hereby incorporated by reference in their entirety.

FIELD OF THE INVENTION

The present invention relates to tuning devices for musical instruments.

BACKGROUND OF THE INVENTION

Digital tuners allow users to easily tune stringed instruments, such as guitars. In particular, the digital tuner can provide an easy to understand display, which allows the user to quickly determine the note being played, and tune the stringed instrument so that the note produced is the note intended by the user.

However, these digital tuners suffer from a number of drawbacks. For example, they must be close to the stringed instrument in order to produce an accurate reading. If it is not sufficiently close, then the digital tuner will be unable to measure the note properly and tuning the stringed instrument will become difficult or impossible. However, this means that the user is either holding the tuner or balancing it closely to the stringed instrument. Neither is desirable because neither replicates normal play positions by the user.

Some users clip the digital tuner to the headstock on the stringed instrument to ensure proximity. However, this is often a temporary solution at best, as the clip must be removed before transport or before storage on a wall-mount or a rack, or in a case. In addition, the clip and tuner are visible to the audience so it is not aesthetically pleasing to leave on during a performance. Further, the clip can ruin the finish of the stringed instrument while being used, placed or removed.

Accordingly, in U.S. Pat. No. 9,240,170 a system is described that can attach a digital tuner to an instrument at locations other than the headstock. U.S. Pat. No. 9,240,170 describes a stringed instrument mountable device that includes a vibration-sensing device configured to detect a note being played on a stringed instrument. The stringed instrument mountable device also includes an attachment configured to attach the vibration-sensing device to the stringed instrument.

However, as is clear from the figures of U.S. Pat. No. 9,240,170, the tuner must be positioned on the side of the instrument facing away from the user; otherwise, it interferes with the user, and thus is actually visible to viewers. Moreover, there are advantages of engaging a tuner to a headstock that are lost when attaching the tuner elsewhere, such as visibility of the display while playing.

It is an object of the present invention to provide novel tuners that can be directly engaged with a musical instrument, including on the headstock, yet are inconspicuous and/or invisible, in particular when the instruments are used during a performance;

Another object is to provide tuners that allow abrupt movements of the musical instruments without the tuners falling off the instruments.

Yet another object is to allow the tuners to be detachable, i.e. not affixed to the instrument, yet according to desire, capable of being left on the instrument when the instrument is put away in a case, with minimal or no hindrance and movement of the tuner.

Further objects and advantages of this invention will appear as the description proceeds.

SUMMARY OF THE INVENTION

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

According to one aspect of the present disclosure, a tuning device for a musical instrument is provided, the instrument having:
  a body;
  a neck extending out from the body;
  the neck having a free end including a headstock;
  the headstock including:
    a plane anterior instrument surface;
    a plane posterior instrument surface essentially opposite to the anterior instrument surface, and
    at least one tuning key disposed on the posterior instrument surface,
  the tuning device includes:
  including a tuning display;
  means for engaging the tuning device with one or more of the at least one tuning key, and
  wherein the display is positioned on the tuning device such as to essentially face the body when the tuner is both engaged with the one or more tuning key, and entirely disposed above the posterior surface.

Preferably, the tuning device further includes means for detaching the tuning device from the one or more tuning key. Preferably, means for engaging the tuning device and means for detaching the tuning device are the same.

In particular, the tuning device is preferably magnetically engageable with the one or more tuning key.

According to another aspect of the present disclosure, a tuning device for a musical instrument is provided, the instrument having:
  a body;
  a neck extending out from the body;
  the neck having a free end including a headstock;
  the headstock including:
    a plane anterior instrument surface,
    a plane posterior instrument surface essentially opposite to the anterior instrument surface;
  the tuning device:
  including a tuning display;
  engagable with the posterior instrument surface, and
  wherein the display is positioned on the posterior instrument surface such as to essentially face the body while the tuner is both engaged with the posterior instrument surface and entirely disposed above the posterior surface.

Preferably, the tuning device engagable with the posterior surface is detachable from the posterior surface.

Optionally, the means for engaging the tuning device with the posterior surface is a suction device.

The musical instrument is for example any of the following: acoustic guitar, electric guitar and bass guitar.

Typically, the tuning device of claim further include a first plane face and an essentially parallel second plane face, wherein when engaged and entirely disposed adjacent to the plane posterior instrument surface, the first plane face faces the plane posterior instrument surface and the second face faces away from the posterior instrument surface.

For example, the second plane face of the tuning device is disposed less than 15 mm from the plane posterior instrument surface and parallel thereto.

Preferred embodiments are configured to allow manual movement of the instrument without disengagement of the tuning device from the instrument.

In preferred embodiments, the posterior instrument surface has a first colour, and the tuning device has a second colour, wherein the first colour and the second colour are substantially similar.

In more preferred embodiments, the second colour is visually essentially undistinguishable from the first colour.

Some embodiments have a trapezoidal prism shape including a slanted face, wherein the display is on the slanted face.

Some embodiments have the shape essentially as illustrated in FIG. 5c.

In some preferred embodiments, the instrument includes least two tuning keys disposed on the posterior instrument surface, and the tuning device is engagable with two or more of the at least two tuning keys.

According to another aspect of the present disclosure, a kit including the tuning device and any of the instruments above is provided, further including a case having a shelf to hold up the neck near the headstock and an accommodation space facing the posterior of the headstock, wherein the case the case can accommodate the tuner and headstock combination unhindered, and wherein the tuner is compact so it can stay attached to the headstock while the instrument is stored in the case.

In some preferred kit embodiments, the tuning device is engaged by the means for engaging the tuning device with the tuning keys and/or with the posterior instrument surface, and is not engaged with the instrument anterior surface.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding of the invention, the description taken with the drawings making apparent to those skilled in the art how the several forms of the invention may be embodied in practice.

In the drawings:

FIG. 1a is an overview of a section of the side of a prior-art musical instrument.

FIG. 1b is an overview of a section of the opposite side of the same instrument.

FIG. 1c shows in a side view the instrument.

FIG. 5a shows another device embodiment that can be coupled to an instrument with an adaptor. The figure depicts a top view of the adaptor.

FIG. 5b shows the adaptor in perspective view.

FIG. 5c presents the tuner alone.

FIG. 5d shows the tuner and the adaptor assembled together.

Figure 8:
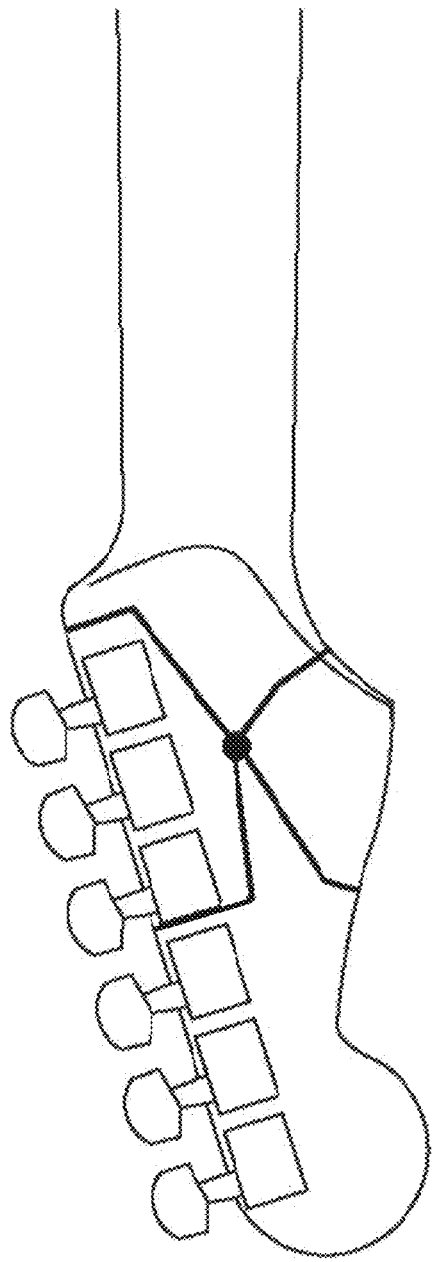

Alternatively, the tuning device can be engaged with the posterior instrument surface as shown in FIG. 8, by using a "spider" clamp having resilient ends.

DESCRIPTION OF THE PREFERRED EMBODIMENTS

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. For clarity, non-essential tuning keys were omitted from some of the drawings.

FIG. 1a is an overview of a section of the side of a prior-art musical instrument 10, specifically the headstock 19 and part of the fretboard of a guitar. The strings 11 are visible, indicating that this side of the instrument typically faces an audience when the instrument 10 is played. The instrument 10 has a plane anterior instrument surface 12.

FIG. 1b is an overview of the opposite side of the same instrument 10. The strings are not visible from this side. The instrument 10 has a plane posterior instrument surface 14, which is typically hidden from audience view.

The instrument further includes instrument-tuning keys 16 that are typically, manually adjustable to tune the strings 11 coupled thereto. The keys 16 are affixed to the instrument 10 and disposed on the anterior instrument surface 12 and on the posterior instrument surface 14.

The strings 11 require periodical tuning. The tuning can be accomplished before a performance; however, often the instrument 10 requires additional retuning during a performance. A tuner, alternatively referred to as a tuning device, is then typically used to do the retuning.

FIG. 1c shows in a side view the entire instrument 10. The instrument 10 further includes a body 15 and a neck 17 extending therefrom. The neck 17 has a free end including the headstock 19.

Figure 2:
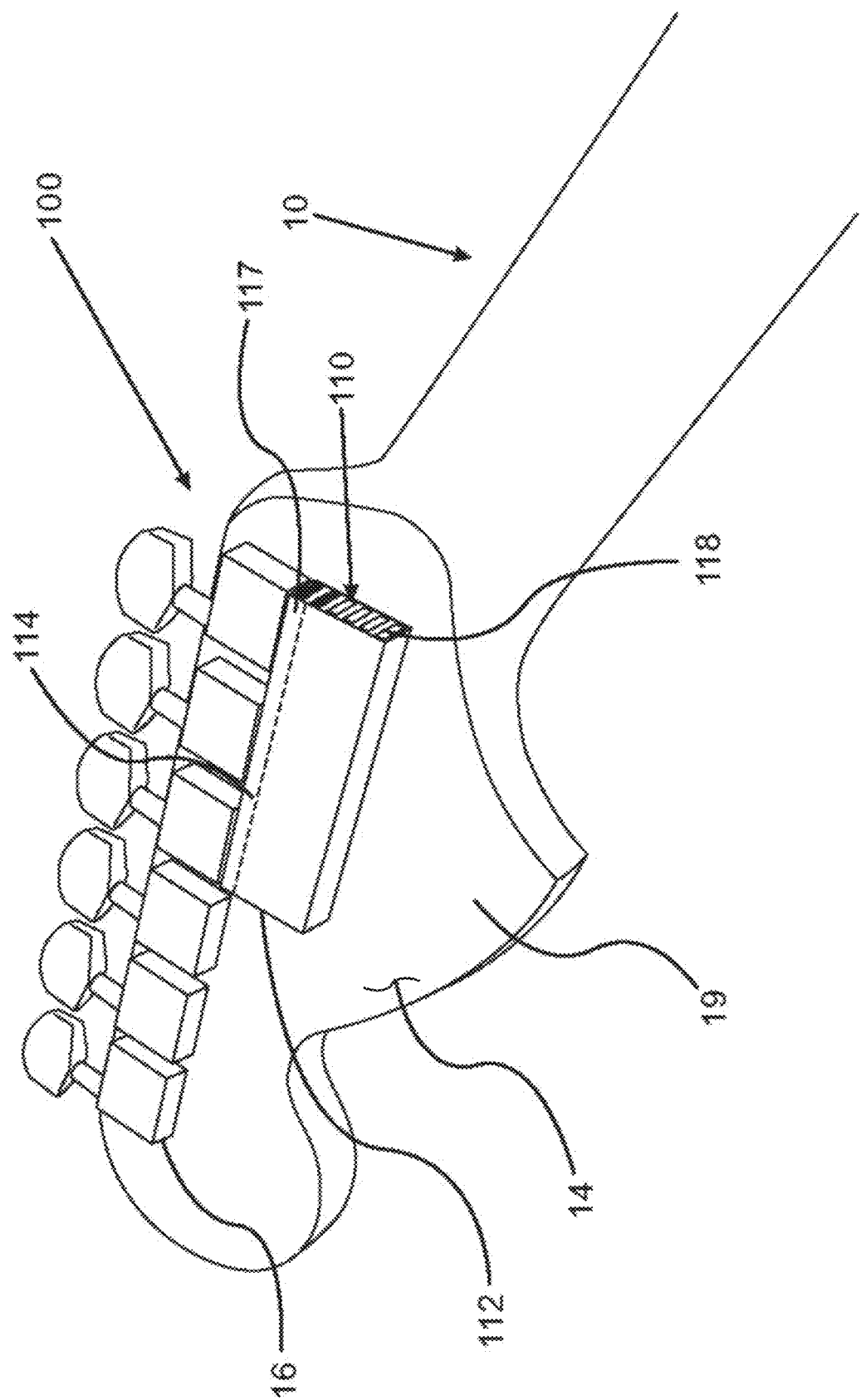
FIG. 2 shows a musical instrument having an anterior instrument surface (not visible in the figure), a posterior instrument surface essentially opposite to the anterior instrument surface, and a tuning device, wherein the tuning device is configured to allow tuning of the instrument and is minimally visible or invisible when viewing the posterior instrument surface.

As shown in FIG. 2, the keys 16, although usually more conspicuously jutting out from the instrument 10 in parallel to the anterior and posterior instrument surfaces 14, also extend essentially perpendicular out from the posterior instrument surface 14.

As further shown in FIG. 2, a device 110 for tuning the musical instrument 10 is provided. The tuning device 110 includes a tuning display 118. The tuning device 110 is engagable with at least one tuning key 16. The display 118 is positioned on the tuning device 110 such as to essentially face the body 15 when the tuning device 110 is both engaged with the one or more tuning key 16, and entirely disposed above the posterior instrument surface 14.

In alternative embodiments, the tuning device is engageable with the posterior instrument surface 14 instead of or in addition to engageability with the tuning keys 16.

The position and structure of the tuner allow a player holding and playing the instrument 10 to tune the instrument 10 according to readings on the display 118.

At the same time, the configuration of the tuning device 110 may allow the tuning device 110 to have minimum visibility to an audience and provide stability to the engagement of the tuning device 110, i.e., the tuning device 110 may not travel across the posterior instrument surface 14, in particular when the instrument is rather energetically manipulated, such as an electric guitar is sometimes handled at live performances.

In some preferred embodiments, the tuning device 110 is engagable with at least two of the tuning keys 16, to enhance the engagement. The enhanced engagement may further stabilize the position of the tuning device 110 over the posterior instrument surface 14.

In preferred embodiments, the tuning device 110 is detachable, i.e., not affixed to the instrument. The detachable device 110 may be laid flat against the posterior instrument surface 14 and shunted along the posterior instrument surface 14 until engaging with the tuning keys 16. Detachment requires moving the tuning device 110 away from the keys 16.

The musical instrument 10 and the tuning device 110 may be provided as a kit 100.

Figure 3:
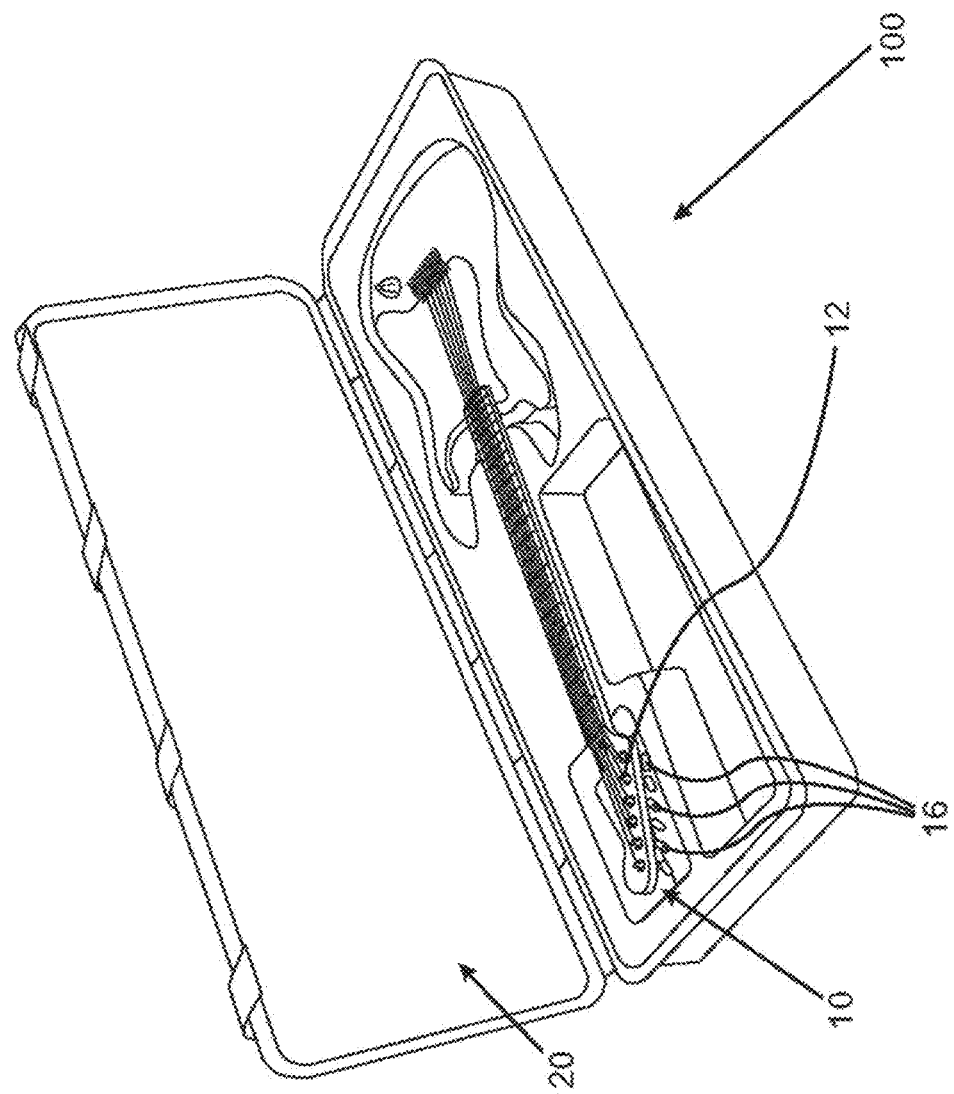
FIG. 3 shows a kit including the tuning device and the instrument and further including a case configured to allow secure encasing of the musical instrument therein, wherein the kit is configured to allow unhindered placing of the musical instrument in the case, without disengaging the tuning device from the instrument.

As shown in FIG. 3, in some embodiments the kit 100 further includes a case 20 to allow secure encasing of the musical instrument 10 therein. The kit 100 allows unhindered placing of the musical instrument 10 in the case 20, without disengaging the tuning device from the instrument 10, while the tuning device is engaged with the tuning keys 16. Note that in the figure the tuning device is not visible as the musical instrument 10 is typically placed in the case 20 with the anterior instrument surface 12 facing inwards.

The musical instrument is selected from a group including: electric guitar, acoustic guitar, and bass guitar.

The tuning device 110 preferably extends parallel to the posterior instrument surface 14 substantially more than perpendicular out of the plane posterior instrument surface 14, i.e. the tuning device 110 is essentially flat, wherein when mounted, the device first face 119 that faces the plane posterior instrument surface 14 is essentially flat, and the device second face 115 that faces away from the plane posterior instrument surface 14 is essentially flat as well and parallel to the first device face 119. The flatness lends stability to the position of device 110, for example, when the instrument is jerked around during playing, as well as minimizing the visibility of the tuning device 110 to an audience, and allows storage of the instrument with the tuning device thereon, on a wall-mount or a rack, or in a case.

Most preferably, the tuning device extends no more than 15 mm perpendicular to the posterior instrument surface 14, and has edges parallel to the posterior instrument surface 14 with a length of at least 15 mm.

The posterior instrument surface 14 has a first colour, and the tuning device 110 has a second colour. In some preferred embodiments, the first colour and the second colour are substantially similar.

In some preferred embodiments, the second colour is visually undistinguishable from the first colour.

Figure 4:
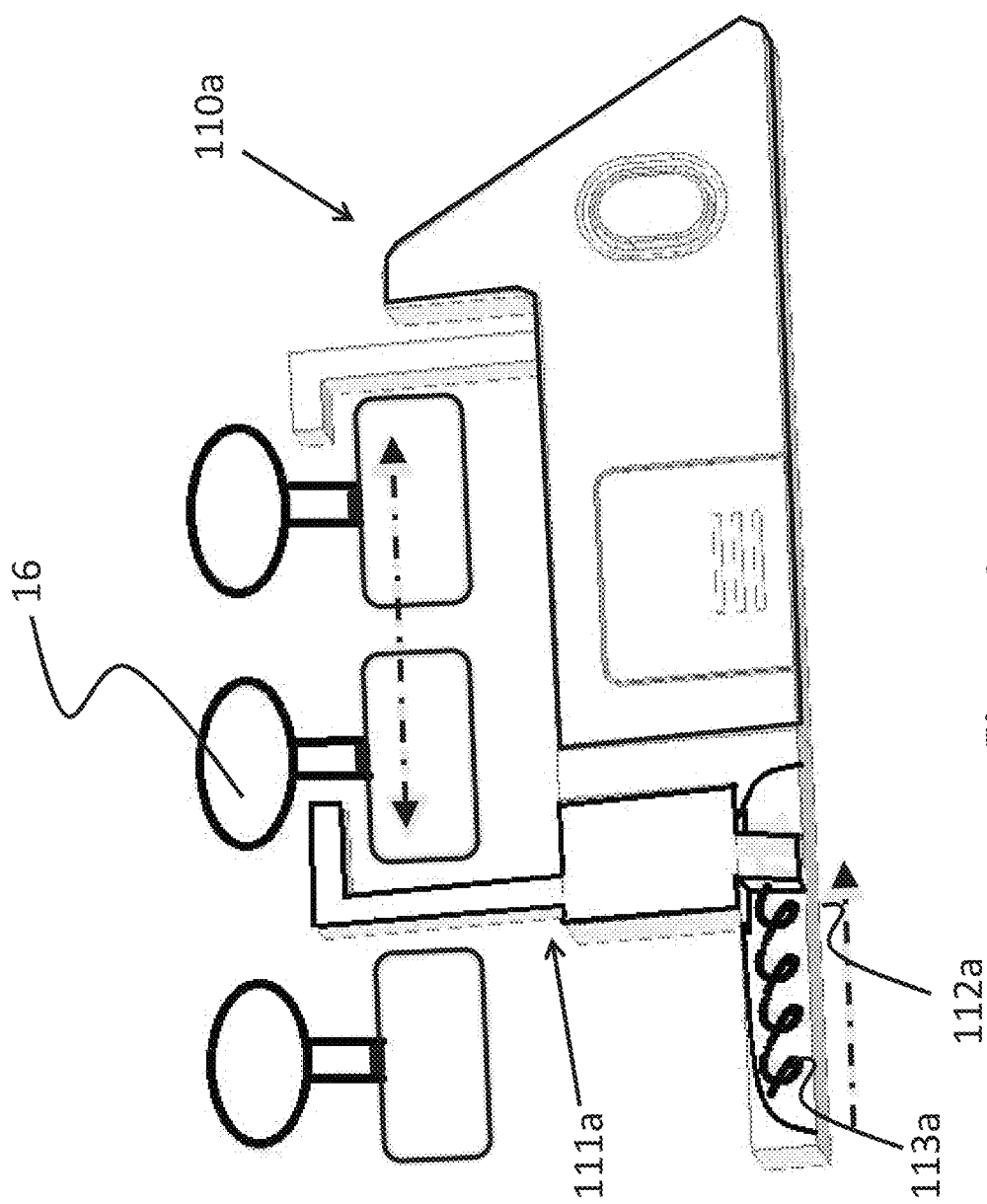
FIG. 4 illustrates in perspective view one device embodiment including a clamp.

FIG. 4 illustrates in perspective cutout view one device embodiment 110a including a clamp 111a. The clamp 111a is configured to allow the tuning device 110a to resiliently engage the tuning keys 16, as the clamp 111a includes a spring 113a in the base 112a of the tuning device. Experiments with a prototype of the embodiment 110a found the device 110a to have a fairly stable engagement.

FIGS. 5a-5d show another device embodiment 110b that can be coupled to the headstock with an adaptor 120. FIG. 5a depicts a top view of the adaptor 120 and FIG. 5b shows the adaptor 120 in perspective view. FIG. 5c presents the tuning device 110b alone and FIG. 5d shows the tuning device 110b and the adaptor 120 assembled. Typically, tuning device 110b is shaped as a right-handed triangle 111b fused to an oblong 113b. The base of the triangle 111b is contiguous with a long side of the oblong 113b. A side 119b of the triangle 111b, normal to the base, is fused to a short side of the oblong 113b and is longer than or equal to the short side of the oblong 113b. The tuning display is typically disposed on the hypotenuse 116b of the triangle 111b. Preferably, the tuning device 110b is magnetically engaged with the one or more tuning key by a magnet [not shown].

The tuning device 110b, while having minimum size to be as invisible as possible, has sufficient size to allow firm engagement, yet has a large sloped 116b face for a tuning display (see the embodiment depicted below and in FIG. 7).

Figure 6A:
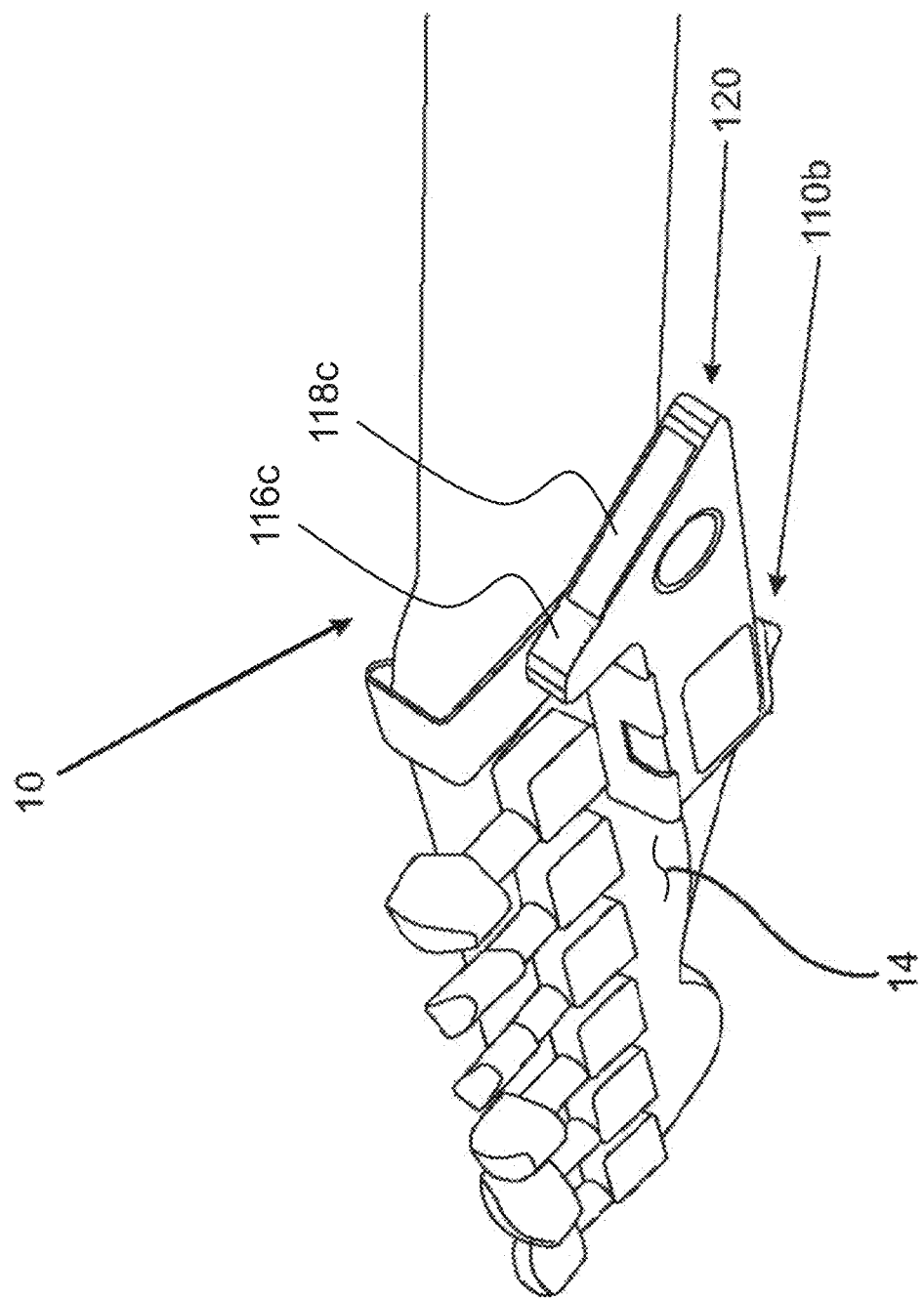
FIG. 6a illustrates how the adaptor and device may be mounted on the instrument. The figure shows a view of the posterior instrument surface.
Figure 6B:
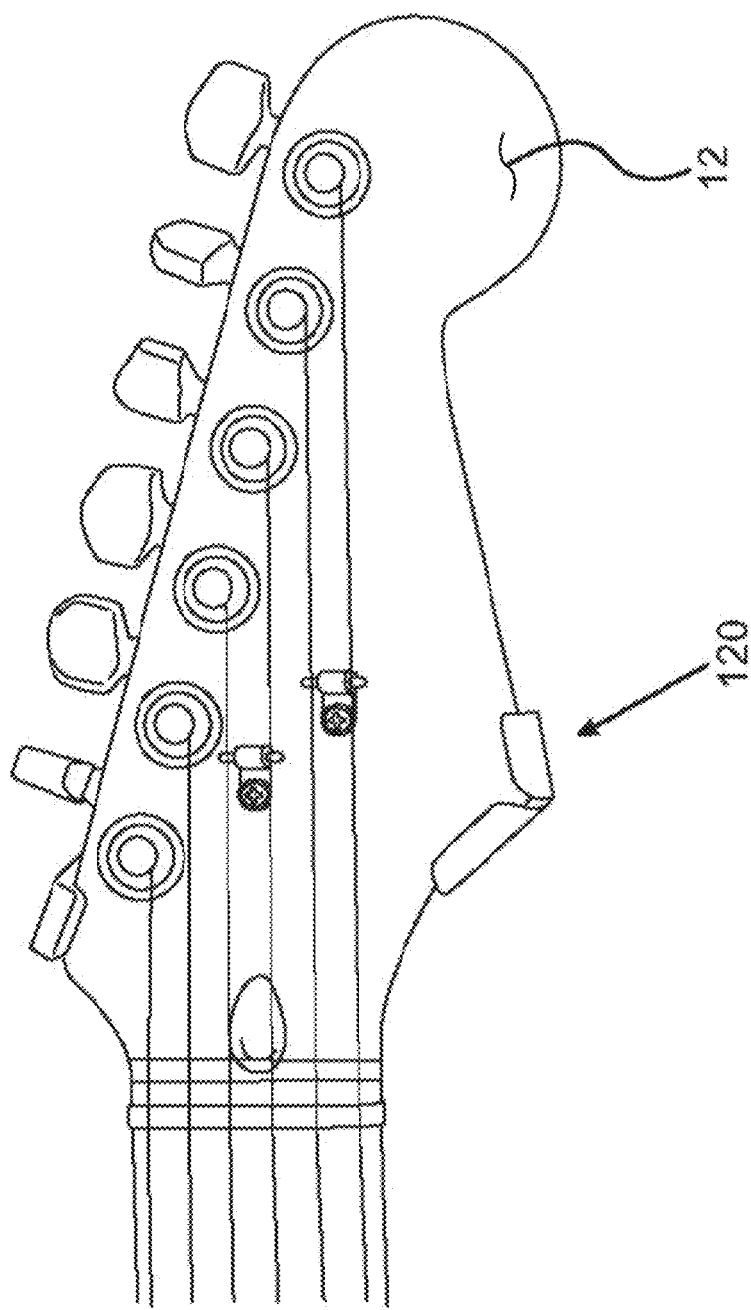
FIG. 6b shows a view from the anterior instrument surface.
Figure 6C:
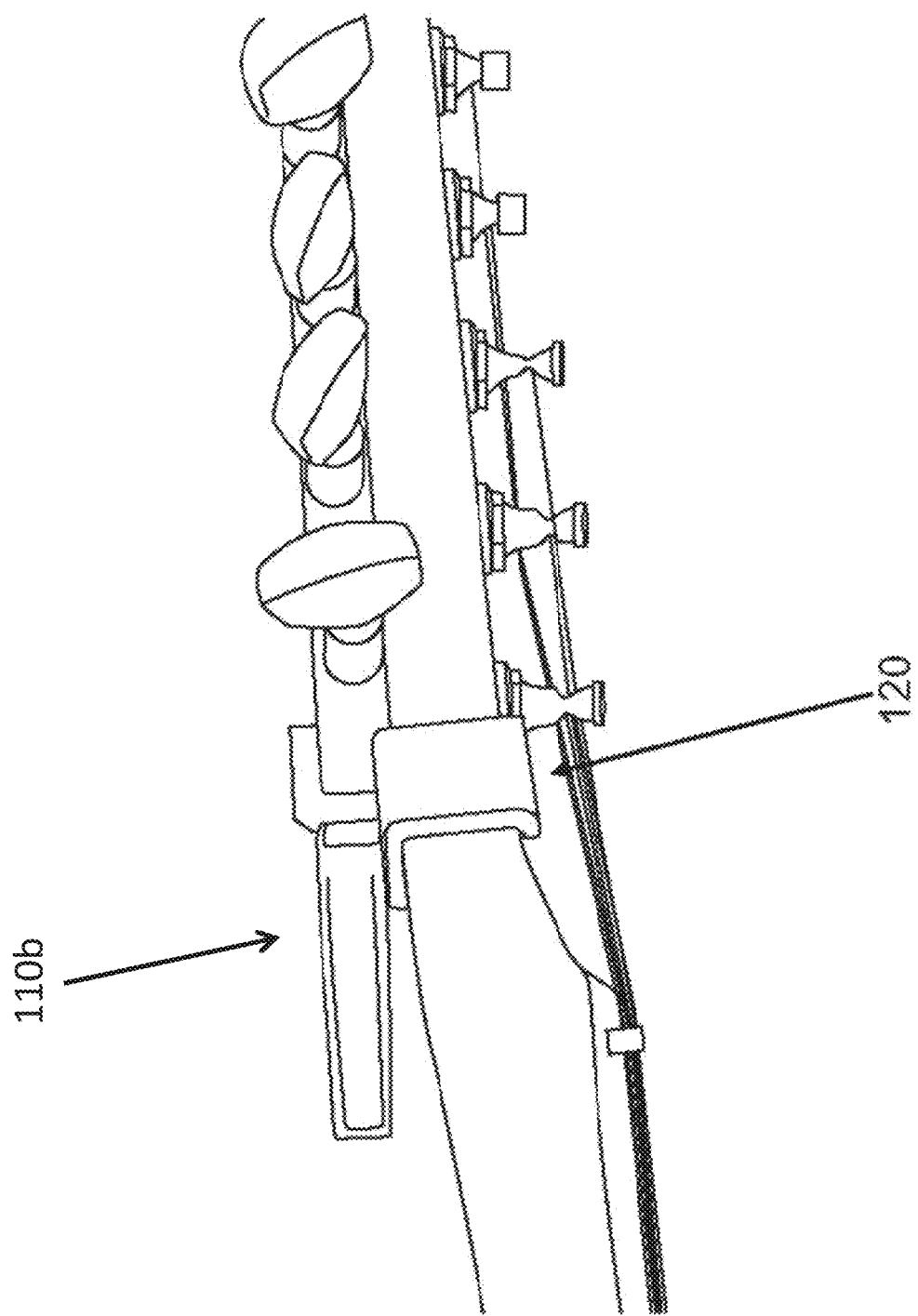
FIG. 6c depicts a top view of the instrument.

FIGS. 6a-6c illustrate how the adaptor 120 and device 110b are mounted on the instrument 10 and appear, from various views. FIG. 6a shows a view of the posterior instrument surface 14; FIG. 6b shows a view of the anterior instrument surface 12, and FIG. 6c depicts a top view of the instrument 10.

The tuning device 110b is completely stable on the instrument 10, and cannot be inadvertently dislodged, and the adaptor 120 is essentially transparent. However, we aspired to design an embodiment that is invisible from the viewpoint of the anterior instrument surface.

Figure 7:
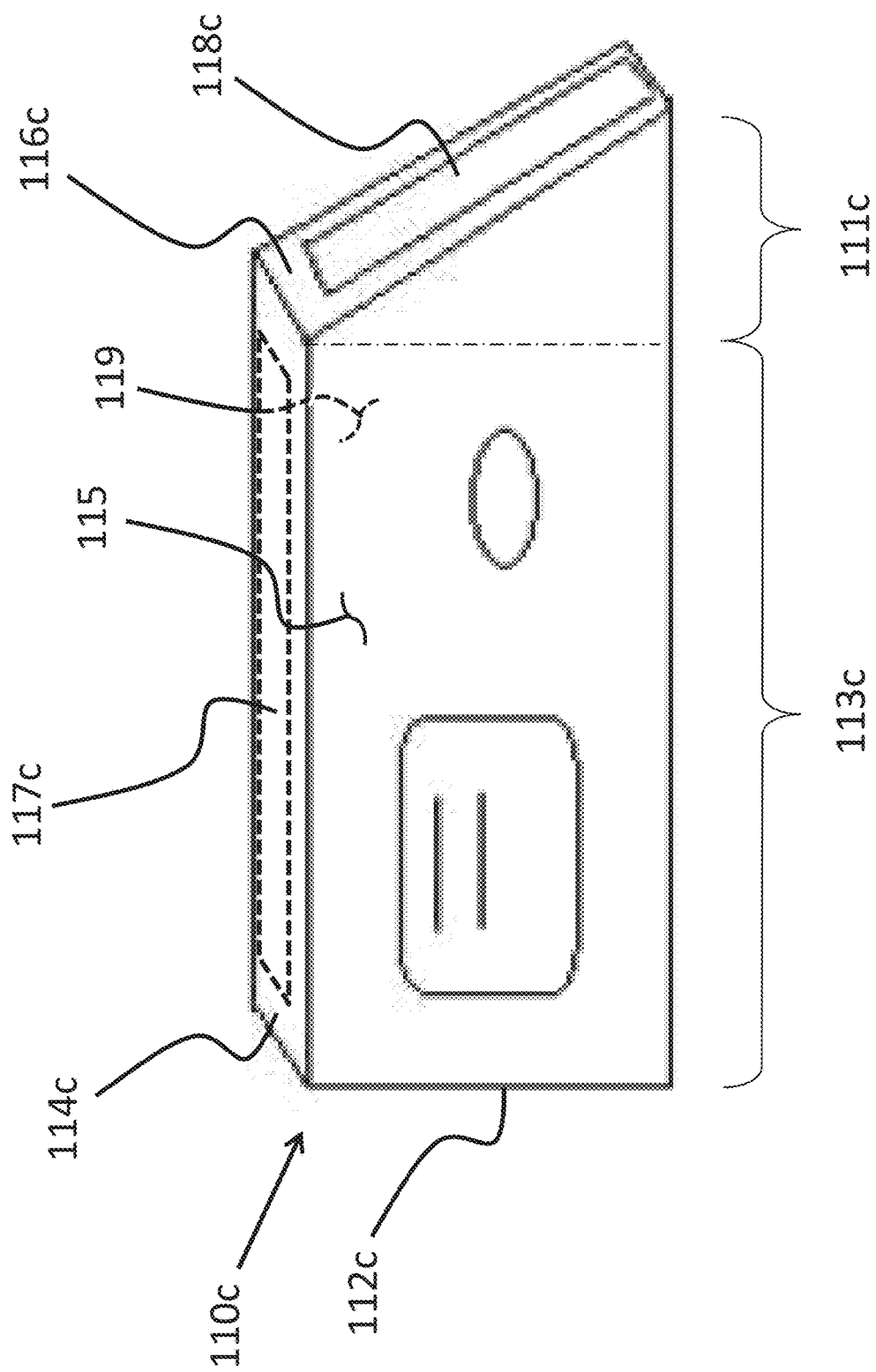
FIG. 7 shows a device including a slanted tuning display.

FIG. 7 illustrates in perspective view a device embodiment 110c.

The tuning device 110c has a trapezoidal prism shape including a slanted face 116c, wherein the tuning display 118c is on the slanted face 116c. The tuning device 110c is engaged with the tuning keys 16 via a first device side face 112c such that the display 118c is oriented essentially straight at the body 15 and at the player holding the instrument 10. Optionally, tuning device 110c is shaped as a right-handed triangle 111c fused to an oblong 113c. The base of the triangle 111c is contiguous with a long side of the oblong 113c. A side of the triangle 111c, normal to the base, is fused to a short side of the oblong 113c and is longer than or equal to the short side of the oblong 113c. The tuning display is typically disposed on the hypotenuse 116c of the triangle 111c. Preferably, the tuning device 110c is magnetically engaged with the one or more tuning key by a magnet 117c.

As briefly mentioned above, some device embodiments (not shown) are engagable with the posterior instrument surface instead of/in addition to with the tuning keys, and also have a display that is oriented towards the body when engaged therewith. Such engagement preferably does not involve fixation. For example, the engagement can be by vacuum/suction, such as via suction cups. Care should be exercised to avoid damage to the paint and/or varnish on the instrument from the engagement.

Alternatively, the tuning device can be engaged with the posterior instrument surface, at least at the edges thereof, as schematically shown in FIG. 8, with a "spider" clamp having resilient ends.

In preferred device-instrument kit embodiments the tuning device is not engaged directly or indirectly with the anterior instrument surface when engaged with the posterior instrument surface and/or tuning keys, so that there are no extraneous parts visible on the anterior surface.

In more preferred embodiments, the tuning device 110 is magnetically engageable with the tuning keys 16. Typically, the tuning device 110 includes a magnet 117 or magnetized material, on or proximal to a second device side surface 114 (see FIG. 2) that is generally normal to the first device side surface 112, wherein the keys 16 include ferromagnetic material.

At present, I believe that this embodiment operates most efficiently, but the other embodiments are also satisfactory.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A tuning device for a musical instrument having a body, a neck extending out from the body, the neck having a free end comprising a headstock which includes a plain anterior instrument surface, a plane posterior instrument surface essentially opposite to the anterior instrument surface, and at least one tuning key disposed on the posterior instrument surface, the tuning device comprising:
   a tuning display;
   means for engaging the tuning device with one or more of the at least one tuning key; and
   the tuning device having a shape comprising a right-handed triangle fused to an oblong,
   wherein the base of the triangle is contiguous with a long side of the oblong,
   wherein a side of the triangle normal to the base is fused to a short side of the oblong and is longer than or equal to the short side of the oblong,
   wherein the tuning display is disposed on the hypotenuse of the triangle,
   wherein the tuning display is positioned on the tuning device such as to essentially face the instrument's body when the tuning device is both engaged with the one or more tuning key, and entirely disposed adjacent to the posterior instrument surface.

2. The tuning device of claim 1, further comprising means for detaching the tuning device from the at least one tuning key.

3. The tuning device of claim 1, wherein the one or more tuning keys comprise ferromagnetic material and wherein said means for engaging the tuning device with the one or more tuning key is a magnet.

4. The tuning device of claim 1, wherein the musical instrument is selected from a group comprising: acoustic guitar, electric guitar and bass guitar.

5. The tuning device of claim 1, further comprising a first plane face and a parallel second plane face, wherein when engaged and entirely disposed adjacent to the plane posterior instrument surface, said first plane face faces the plane posterior instrument surface and said second face faces away from the plane posterior instrument surface.

6. The tuning device of claim 5, wherein said second plane face is disposed less than 15 mm from the plane posterior instrument surface and parallel thereto.

7. The tuning device of claim 1, configured to allow manual movement of the instrument without disengagement of the tuning device from the instrument.

8. The tuning device of claim 1, wherein the posterior instrument surface has a first color, and the tuning device has a second color, wherein the first color and the second color are substantially similar.

9. The tuning device of claim 8, wherein the second color is visually essentially undistinguishable from the first color.

10. The tuning device of claim 1, wherein the said side of the triangle normal to the base and fused to a short side of the oblong is truncated forming a place that is flush with a second long side of the oblong.

11. The tuning device of claim 1, wherein the instrument comprises least two tuning keys disposed on the posterior instrument surface, and wherein the tuning device is engageable with two or more of the at least two tuning keys.

12. The tuning device of claim 1, wherein said means for engaging the tuning device with one or more of the at least one tuning key, and said means for detaching the tuning device from the at least one tuning key, are the same.

13. The tuning device of claim 1, wherein said means for engaging the tuning device with the one or more tuning key is selected from a group consisting of: a spring-loaded clamping system, a suction device, a headstock-holder type adapter and a spider clamp type adapter.

14. A kit comprising:
   the tuning device and instrument of claim 1; and
   a case having a shelf to hold up the neck near the headstock and an accommodation space facing the posterior of the headstock,
   wherein the case accommodates the tuner and headstock combination unhindered, and
   wherein the tuner is compact so the tuner stays attached to the headstock while the instrument is stored in the case.

15. A kit comprising:
   the tuning device and the instrument of claim 1, wherein the tuning device is engaged by said means for engaging the tuning device with the tuning keys and is not engaged with the anterior instrument surface.

16. A tuning device for a musical instrument having a body, a neck extending out from the instrument's body, the neck having a free end comprising a headstock including a plane anterior instrument surface, a plane posterior instrument surface essentially opposite to the anterior instrument surface, the tuning device comprising:
  a tuning display;
  means for engaging the tuning device with the posterior instrument surface; and
  the tuning device having a shape comprising a right-handed triangle fused to an oblong,
  wherein the base of the triangle is contiguous with a first long side of the oblong,
  wherein a side of the triangle normal to the base is fused to a short side of the oblong and is longer than or equal to the short side of the oblong,
  wherein the tuning display is disposed on the hypotenuse of the triangle, and
  wherein the tuning display is positioned on the posterior instrument surface such as to essentially surface the instrument's body while the tuning device is both engaged with the posterior instrument surface and entirely disposed above the posterior instrument surface, and is not engaged with the anterior instrument surface.

17. The tuning device of claim 16, further comprising means for detaching the tuning device from the posterior instrument surface.

18. The tuning device of claim 16, wherein said means for engaging the tuning device with the posterior instrument surface is a suction device.

19. The tuning device of claim 16, wherein the musical instrument is selected from a group comprising: acoustic guitar, electric guitar and bass guitar.

20. The tuning device of claim 16, further comprising a first plane face and a parallel second plane face, wherein when engaged and entirely disposed adjacent to the plane posterior instrument surface, said first plane face faces the plane posterior instrument surface and said second face faces away from the posterior instrument surface.

21. The tuning device of claim 20, wherein said second plane face is disposed less than 15 mm from the plane posterior instrument surface and parallel thereto.

22. The tuning device of claim 16, configured to allow manual movement of the instrument without disengagement of the tuning device from the instrument.

23. The tuning device of claim 16, wherein the plane posterior instrument surface has a first color, and the tuning device has a second color, wherein the first color and the second color are substantially similar.

24. The tuning device of claim 23, wherein the second color is visually essentially undistinguishable from the first color.

25. The tuning device of claim 16, wherein the said side of the triangle normal to the base and fused to a short side of the oblong is truncated forming a place that is flush with a second long side of the oblong.

26. The tuning device of claim 16, wherein the instrument comprises least two tuning keys disposed on the plane posterior instrument surface, and wherein the tuning device is engageable with two or more of the at least two tuning keys.

27. The tuning device of claim 16, wherein said means for engaging the tuning device with one or more of the at least one tuning key, and said means for detaching the tuning device from the at least one tuning key, are the same.

28. The tuning device of claim 16, wherein said means for engaging the tuning device with the one or more tuning key is selected from a group consisting of: a spring-loaded clamping system, a suction device, a headstock-holder type adapter and a spider clamp type adapter.

29. A kit comprising:
  the tuning device and instrument of claim 16; and
  a case having a shelf to hold up the neck near the headstock and an accommodation space facing the posterior of the headstock,
  wherein the case accommodates the tuner and headstock combination unhindered, and
  wherein the tuner is compact so the tuner stays attached to the headstock, while the instrument is stored in the case.

* * * * *